(12) United States Patent
von Schleinitz

(10) Patent No.: US 11,319,993 B2
(45) Date of Patent: May 3, 2022

(54) BEARING ASSEMBLY

(71) Applicant: AKTIEBOLAGET SKF, Gothenburg (SE)

(72) Inventor: Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 170 days.

(21) Appl. No.: 16/823,540

(22) Filed: Mar. 19, 2020

(65) Prior Publication Data

US 2020/0309195 A1 Oct. 1, 2020

(30) Foreign Application Priority Data

Mar. 25, 2019 (DE) .......................... 102019204007.1

(51) Int. Cl.
| | | |
|---|---|---|
| *C09D 11/00* | (2014.01) | |
| *F16C 33/58* | (2006.01) | |
| *B43K 5/02* | (2006.01) | |
| *C09D 11/20* | (2006.01) | |
| *C09D 11/17* | (2014.01) | |
| *C09D 7/20* | (2018.01) | |
| *B43K 8/02* | (2006.01) | |
| *C09D 1/00* | (2006.01) | |
| *C09D 4/00* | (2006.01) | |
| *C09D 5/00* | (2006.01) | |
| *C09K 3/00* | (2006.01) | |
| *B05C 17/00* | (2006.01) | |
| *B05C 1/00* | (2006.01) | |

(52) U.S. Cl.
CPC ................ *F16C 33/58* (2013.01); *B43K 5/02* (2013.01); *B43K 8/026* (2013.01); *C09D 7/20* (2018.01); *C09D 11/00* (2013.01); *C09D 11/17* (2013.01); *C09D 11/20* (2013.01); *B05C 1/00* (2013.01); *B05C 17/00* (2013.01); *F16C 2223/30* (2013.01); *F16C 2237/00* (2013.01)

(58) Field of Classification Search
USPC .................................. 106/31.01, 31.13, 31.6
See application file for complete search history.

(56) References Cited

U.S. PATENT DOCUMENTS

| | | | |
|---|---|---|---|
| 2002/0132056 A1* | 9/2002 | Montano ................. | C23C 22/08 427/444 |
| 2014/0334755 A1* | 11/2014 | Krebs ..................... | F16C 33/04 384/322 |
| 2019/0186545 A1* | 6/2019 | Bergmann ......... | F16C 33/6659 |

* cited by examiner

*Primary Examiner* — James E McDonough
(74) *Attorney, Agent, or Firm* — J-Tek Law PLLC; Scott T. Wakeman; Mark A. Ussai

(57) ABSTRACT

A bearing assembly includes at least one inner ring and at least one outer ring, and at least one surface of the inner or outer ring is partially colored with an acid-free ink. If the at least one surface includes a surface defect such as a scratch in a black-oxide coating, the acid-free ink may be applied to the scratch to at least partially conceal it.

8 Claims, 1 Drawing Sheet

BEARING ASSEMBLY

CROSS-REFERENCE

This application claims priority to German patent application no. 10 2019 204 007.1 filed on Mar. 25, 2019, the contents of which are fully incorporated herein by reference.

TECHNOLOGICAL FIELD

The present disclosure relates to a bearing assembly including at least one inner ring and one outer ring and to a black oxide repair pen for repairing damaged areas of a black-oxidized surface of a bearing assembly. In addition, the disclosure relates to an acid-free ink for coating a surface of such a bearing assembly.

BACKGROUND

Bearing assemblies, in particular rolling-element bearings, can include black-oxidized surfaces that provide a variety of technical and service-life-lengthening properties, and among other things, offer corrosion protection as bearing outer surfaces. To produce such a black-oxidized surface, the workpieces or the corresponding surfaces are treated with alkaline solutions in order to form a protective layer due to the resulting oxide layer on the surface of the bearing assembly.

However, such black-oxidized bearing assemblies may suffer small scratches or abrasions in the outer non-functional region during assembly and handling. Although these scratches or abrasions do not impair the function, they are recognizable as silver-colored damaged areas on the black black-oxidized layer.

Up to now, cold black oxide pens or steel-etching-ink pens that work on an acidic basis and that can dissolve the alkaline-generated hot-black-oxidation are used for repairing such damaged areas. Steel etching inks are liquids that contain saltpeter and copper and selenium compounds and generate a black heavy-metal deposit on the surface. Thus while the pens generate a blackening of the damaged area, they also leave behind a clearly visible spot on the surfaces. The deposit of a steel-etching ink is matte black without possible or adjustable color variance. When a black-oxidized surface is repaired, this matte-black region is surrounded by a transition region in which no deposit occurred, but the existing black-oxidation has been attacked by the acid. Only afterwards does the undamaged black oxide appear as a third shade. In addition, they are corrosive and their application on rolling-element bearings is therefore not allowed, since this could lead to corrosion of surfaces of the rolling-element bearing. Therefore, up to now damaged surfaces are post-processed, for example, ground down, and re-black-oxidized. However, this leads to very high costs without equivalent technical value.

SUMMARY

It is therefore the aspect of the present disclosure to provide a way to improve damaged areas, in particular on non-functional surfaces of black-oxidized rolling-element bearings, in a simple and cost-effective manner.

The bearing assembly includes at least one inner ring and one outer ring. The bearing assembly can be, for example, a rolling-element bearing in which rolling elements are disposed between the inner ring and the outer ring. The rolling elements can be balls, rollers, needles, or any other type of rolling elements. Alternatively the bearing assembly can also be a plain bearing.

It has been determined by the inventor that a surface of the inner ring and/or of the outer ring can be colored in a simple manner using an acid-free ink, in particular a printing ink used for labeling metal parts, predominantly metal semi-finished products, such as metal plates and metal tubes. Since the ink is acid-free, the surface, for example, an alkaline black-oxidation, is not attacked, and the already-existing coating is not impaired.

The ink can be applied by immersing the corresponding surface or by brushing or otherwise applying it onto the surface. Since the ink forms a very thin layer (preferably a few micrometers), the coloring of the surface has no influence on the dimensions of the bearing components and can thus be applied onto any surfaces.

Furthermore, the ink can be applied onto differently processed surfaces (oiled, black-oxidized, etc.), since it exhibits very good adhesion properties. In particular, a damaged area of a black-oxidized surface of the bearing assembly can be repaired by such an ink. In this way the damaged area becomes invisible. Thus with a damaged area of the bearing assembly no post-grinding and post-black-oxidation is required, but rather the damaged area can be repaired in a simple manner by applying the ink. This serves for the repair of non-functional surfaces, i.e., of surfaces that predominantly require only one closed black layer, and not of raceways that require the full functionality of a real black oxidation and must not be colored with ink or repaired with ink.

According to a further embodiment, the ink includes organic solvents, colorants, and binders. In particular, the ink can include 85-90% solvents, wherein the solvents preferably contain butanone or 22-butanone and/or ethyl methyl ketone. The ink can be, for example, a printing ink for metal labeling that has shown in tests to be particularly suitable. Even on polished steel, this ink exhibits very good adhesion. The ink dries very quickly and is oil and smudge resistant. Since it is an ink, it adds hardly any thickness onto the, for example, black-oxidized surface. In contrast thereto, lacquer pens exhibit an application thickness that is clearly visible on a thin black-oxidation layer, since they are raised in comparison to the black-oxidation layer. Furthermore, the ink is also durable without degreasing the surface, since the color falls downward through the oil layer onto the surface to be coated and adheres thereto.

Ink of various shades can be used, wherein the color shades are preferably adapted to the color of the surface, for example, to the black oxidation. For example, by varying the colorant or color pigments an ink can be obtained that is grey-black or reddish-black, so that it can be used for black-oxidation repairs of various materials, inter alia case-hardened steel (case-hardened steel tends to black oxidation colors exhibiting a slight tendency toward red, while through-hardening steel is inclined toward black black-oxidation). Other colors could also be used to partially permanently color metal parts, for example, in the context of a labeling.

According to a further embodiment, the bearing assembly includes a surface partially coated with ink. For example, prior to a black oxidation the ink can be applied onto a surface of the bearing assembly in the form of a labeling. After the black oxidizing the possibly maximally surface-attacked ink can be washed off with solvent, and the label appears as bright-steel writing on a ring that is black due to the black oxidation. Such a labeling is also possible independently of a black oxidizing or after a black oxidizing. Furthermore, the ink can be used as a type of invisible ink that appears only under UV or similar testing light. In this way an invisible logo can be printed or applied onto a surface of the bearing assembly, which invisible logo can be sought and verified with a testing light of a specific wavelength in the event of authenticity doubts.

In order to allow for a simple application of the ink, according to a further aspect a black oxide repair pen is provided for repairing damaged areas of a black-oxidized surface of a bearing assembly. The black oxide repair pen can in particular include a reservoir wherein the acid-free ink can be received. The black oxide repair pen can include, for example, a capillary tip in various thicknesses in order to apply the ink onto the surface of the bearing assembly.

According to one embodiment, the reservoir can be a liquid reservoir without an absorbent internal body. The black oxide repair pen can include a mixing ball that, with shaking, mixes the liquid present in the reservoir. A spring-loaded valve then opens when pressure is exerted onto the capillary tip and unblocks the path of the ink into an intermediate chamber fitted with absorbent material. The slotted inlet to the capillary tip is embedded in the absorbent material; the slotted inlet is comprised of plastic and leads the ink to the tip via introduced sections and slots.

Alternatively the ink could also be applied using a brush.

According to a further aspect, an acid-free ink is proposed for coating a surface of a bearing assembly, wherein the ink includes organic solvents, colorants, and binders. In particular, the ink can include 85-90% solvents, wherein the solvents preferably contain butanone or 22-butanone and/or ethyl methyl ketone. In addition, the ink can contain less than 5% 4-methyl-2-pentanon (isobutyl methyl ketone) and dye. Dimethyl sulfoxide can be present. At 20° C. the dynamic viscosity of the ink preferably falls in the range of 2.1-2.4 mPa*s. The density at 20° C. can fall in the range of 0.836-0.838 g/cm$^3$. The vapor pressure at 20° C. is in particular approximately 105 hPa, and the ignition temperature preferably falls at 514° C. The lower explosive limit can fall at 1.8 vol %, and the upper explosive limit at 11.5 vol %. The initial boiling point of the ink preferably falls at approximately 79° C., and the boiling range falls between 79 and 110° C. The flashpoint of the ink used falls in particular at −6° C.

The disclosed ink has the advantage that it adheres immediately to steel even when the steel has only been wiped and not degreased. It cannot be removed or somehow weakened with oil and vigorous rubbing, but rather only with solvents. In tests it has been shown that the ink can permanently withstand a phosphate bath and temporarily also a black-oxidation bath.

The dried ink withstands a complete phosphating process or manganese phosphating process intact and can thus be used as a replacement for a cover lacquer in order to protect partial surfaces of the workpiece from coating. While cover lacquers, such as, for example, galvano- or solder-resist-lacquers must partially be thermally hardened, and after application can only be removed with difficulty and with great manual effort, the ink can be applied by simple brushing and subsequently removed with suitable solvent. In addition to this expanded application use of the ink it is particularly noteworthy here that it is subjected here to an acidic, in particular phosphoric-acid-containing and up to 98° C. hot solution without losing its adhesion, color, or structure.

The disclosed ink is also able to withstand at least one single-stage hot black-oxidation process. Here it is processed with high-alkaline, in particular highly hydroxide-containing solutions at approximately 145° C.

With respect to chemical resistance, the ink is therefore far superior to known metal marking pens that are similar to felt-tip pens. The oil resistance and wiping resistance are particularly important for repairs on a rolling-element bearing. While the markings of metal marking pens similar to felt-tip pens are dissolved very quickly when wiped with an oily cloth, the ink described herein is completely oil-resistant and wipe-resistant. The ink repair cannot be removed using a non-abrasive cloth that is soaked with highly dissolving penetrating oil, even with high contact pressure and intensive manual rubbing. With the passage of time a still-further stabilization of the structure of the dry ink occurs that also makes it increasingly resistant to solvents. While it is initially still easily removable with various solvents, which is desired for possible correction, after days or weeks a removal can only be achieved with selected solvents and some effort.

Further advantages and advantageous embodiments are specified in the description, the drawings, and the claims. Here in particular the combinations of features specified in the description and in the drawings are purely exemplary, so that the features can also be present individually or combined in other ways.

In the following the invention shall be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

Figure 1:
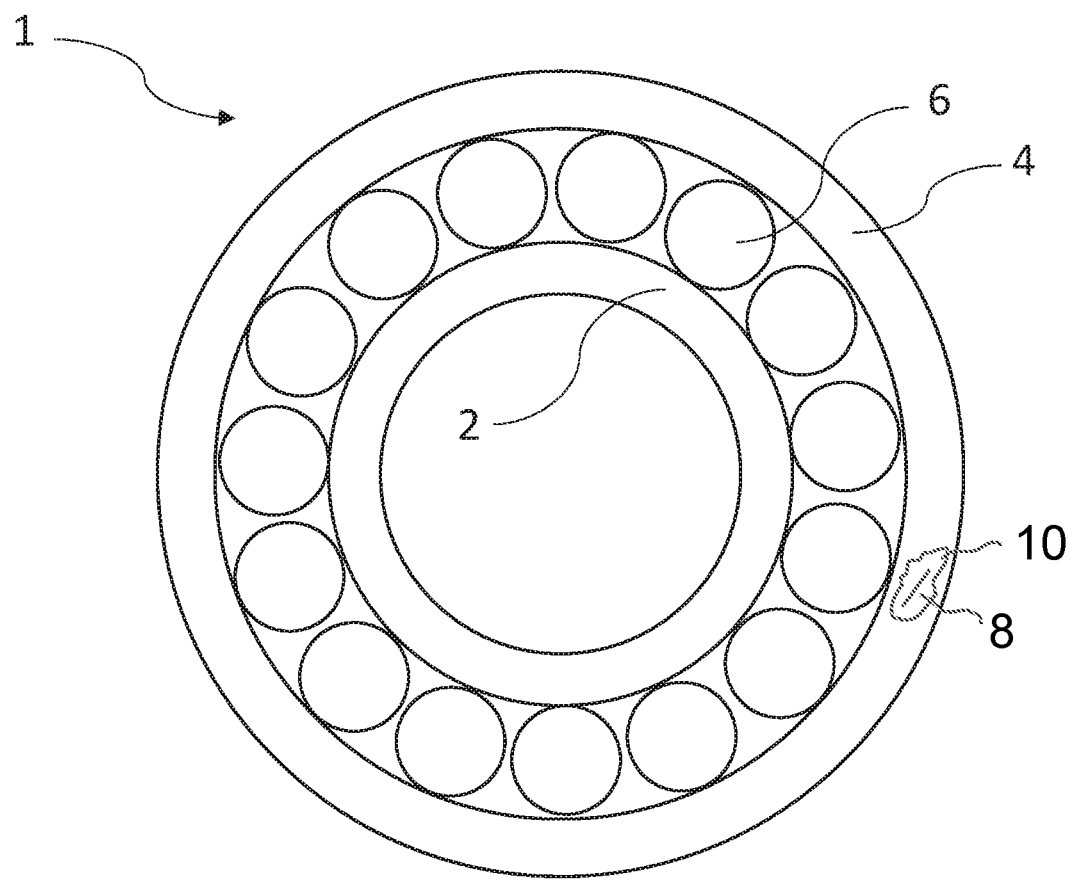
FIG. 1 is a schematic sectional view of a rolling-element bearing.

In the following, identical or functionally equivalent elements are designated by the same reference numbers.

In FIG. 1 a rolling-element bearing 1 is depicted in a greatly simplified manner. The rolling-element bearing 1 includes an inner ring 2 and an outer ring 4. Rolling elements 6 are rotatably disposed between the two rings 2, 4. The rolling elements 6 can be held spaced from one another by a bear cage (not illustrated). This disclosure also applies to plain bearings.

The various components of the rolling-element bearing 1, for example, the inner ring 2 or the outer ring 4, can be partially colored with an acid-free ink. The ink can be applied by applying it to the corresponding surface or by immersing the component into the ink. After the ink has been applied onto the surface, a very thin layer without visible application thickness, for example, only a few micrometers, is present that causes a coloring of the corresponding surface.

The ink can in particular also be applied onto a damaged area (e.g., the region of scratch 8) of a black-oxidized layer of the inner ring 2 or of the outer ring 4. In bearings, surfaces are often black-oxidized by immersing the bearing components, such as, for example, the inner ring 2 or the outer ring 4, in an alkaline solution that creates a mixed oxidation layer on the surface. During assembly of the bearing assembly 1, the black-oxidation layer can be scratched to a depth of only a few micrometers. Although such scratches 8 do not interfere with the functionality of the layer, it is preferred that such scratches not be visible. Up to now a post-black-oxidation of such surfaces has therefore been carried out. However, for this purpose it is necessary under certain circumstances to first grind down the surfaces, and then subsequently post-black-oxidize them. This increases costs. In addition, the post-black-oxidation is only acceptable for a rolling-element bearing when important surfaces have been fully mechanically post-processed; otherwise function-critical damage could arise.

In order to avoid this, in the bearing assembly 1 described here a damaged area 8 of a black-oxidized surface of an element of the bearing assembly 1, for example, of the inner ring 2 or of the outer ring 4, can be colored by applying the ink to the region 10 surrounding the scratch 8.

The ink is preferably solvent-containing and contains no acid, so that any black-oxidized layer already present on the surface will not be attacked. Since it is a very inviscid liquid, the ink can be applied in a very slight thickness whereby no difference in thickness can be recognized between the damaged area that is treated with ink and the remaining black-oxidized layer. The ink can contain colorants in order to color the surface or in order to match the damaged area in color to the remaining black-oxidation layer.

Due to the bearing assembly described here it is possible to avoid a post-grinding and post-black-oxidation of a damaged black-oxidized surface by repairing damaged areas with an ink instead. Furthermore, outside of functional surfaces a coloring of the bearing assembly 1 or its components, for example, of the inner ring 2 and of the outer ring 4, can be carried out by the ink.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing
2 Inner ring
4 Outer ring
6 Rolling element

What is claimed is:

1. A bearing assembly comprising:
at least one inner ring, and
at least one outer ring,
wherein at least one surface of the inner ring and/or at least one surface of the outer ring is partially colored with an acid-free ink.

2. The bearing assembly according to claim 1,
wherein the at least one surface of the inner ring and/or the at least one surface of the outer ring includes a black-oxidized layer having a surface defect and wherein the surface defect is coated with the acid-free ink.

3. The bearing assembly according to claim 1,
wherein the acid-free ink includes organic solvents, colorants, and binders.

4. The bearing assembly according to claim 3, wherein the acid-free ink includes 85-90% solvents.

5. The bearing assembly according to claim 4, wherein the solvents include butanone, 2-butanone, and/or ethyl methyl ketone.

6. The bearing assembly according to claim 3, wherein the black-oxidized surface has a color and wherein the colorant is selected to match the color.

7. The bearing assembly according to claim 2, wherein the surface defect is a scratch in the black-oxidized layer.

8. The bearing assembly according to claim 1,
wherein the at least one surface of the inner ring and/or the at least one surface of the outer ring includes a black-oxidized layer having a scratch,
wherein the scratch is coated with the acid-free ink,
wherein the acid-free ink includes organic solvents, colorants, and binders,
wherein the solvents include butanone, 2-butanone, and/or ethyl methyl ketone, and
wherein the black-oxidized surface has a color and wherein the colorant is selected to match the color.

* * * * *